United States Patent [19]
Schmidt

[11] 3,872,164
[45] Mar. 18, 1975

[54] PREPARATION OF GLYOCOL ACETATES

[75] Inventor: John P. Schmidt, Princeton, N.J.

[73] Assignee: Halcon International, Inc., New York, N.Y.

[22] Filed: Dec. 12, 1973

[21] Appl. No.: 424,039

[52] U.S. Cl............................................. 260/497 R
[51] Int. Cl........................ C07c 67/04, C07c 69/16
[58] Field of Search ................................ 260/497 R

[56] References Cited
UNITED STATES PATENTS

| 3,689,535 | 9/1972 | Kollar | 260/497 R |
|---|---|---|---|
| 3,715,388 | 2/1972 | Valbert | 260/497 R |
| 3,715,389 | 2/1973 | Hoch et al. | 260/497 R |
| 3,743,672 | 7/1973 | Kollar | 260/497 R |
| 3,770,813 | 11/1973 | Kollar | 260/497 R |
| 3,789,065 | 1/1974 | Kollar | 260/497 R |

Primary Examiner—Lorraine A. Weinberger
Assistant Examiner—Richard D. Kelly
Attorney, Agent, or Firm—William C. Long; David Dick; Riggs T. Stewart

[57] ABSTRACT

In the preparation of glycol acetates by the liquid phase reaction of ethylene, molecular oxygen and acetic acid in a catalyst system comprising a variable valent cation in association with bromine, chlorine, a bromine-containing compound, or a chlorine-containing compound, improved operation is achieved by maintaining a level of formic moieties in the liquid feed to the oxidation zone of 3 to 10 weight percent, preferably 4 to 8 weight percent.

14 Claims, 1 Drawing Figure

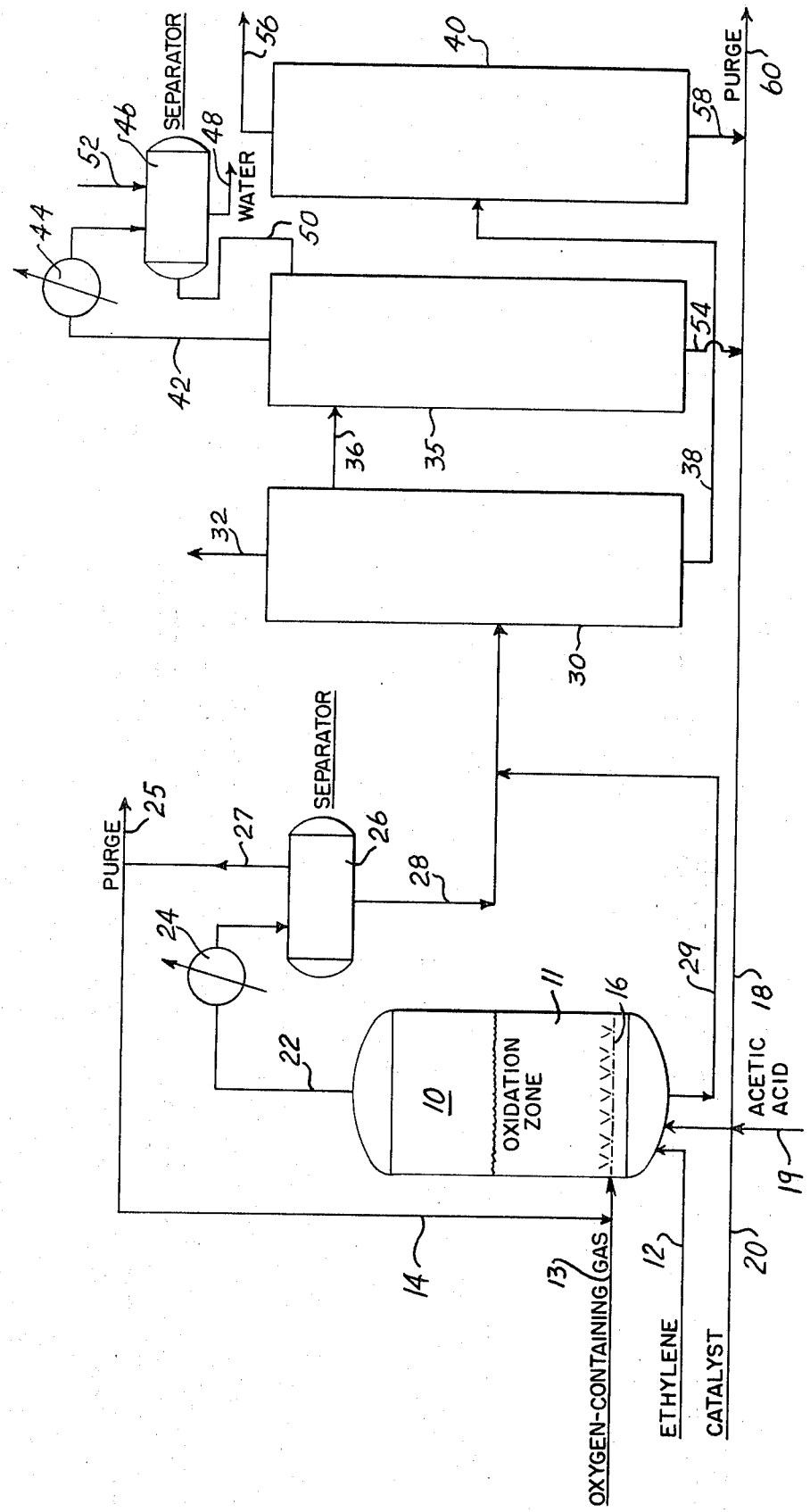

PREPARATION OF GLYOCOL ACETATES

This invention relates to the preparation of acetates of vicinal dihydroxy compounds or glycols and is more particularly concerned with an improved process for producing such glycol acetates in a catalytic reaction involving ethylene, acetic acid and oxygen.

Glycol acetates, which may be mono-acetates or di-acetates, are particularly useful organic chemical intermediates and extractive solvents. The glycol acetates produced from ethylene, for example, are useful in the production of ethylene glycol, an important commercial chemical. Catalytic processes for the preparation of glycol acetates have been disclosed, for example, in Belgian Pat. Nos. 738,104 and 738,463. Ethylene glycol may be prepared by the hydrolysis of ethylene glycol acetates as disclosed in Belgian Pat. No. 749,685.

While the known processes for producing glycol acetates, such as disclosed in the above-mentioned patents, are effective for the indicated purposes, they are susceptible of meaningful improvement from the standpoint of optimum operation, particularly with regard to maximum selectivity to the desired products, with corresponding improvement in product yield.

It is accordingly an object of the present invention to provide an improved process for the preparation of glycol acetates wherein by-product formation is reduced and a high order of selectivity to ester products is obtained.

It has been discovered that these and other objects can be achieved by supplying the reaction with controlled amounts of formic moieties. More specifically, the process of this invention contemplates the carrying out of the reaction among the ethylene, acetic acid and oxygen by supplying a liquid feed to the oxidation zone which has been provided with 3 to 10 weight percent, preferably 4 to 8 weight, of formic moieties, calculated as formic acid. When the quantity of formic moieties fed to the system is controlled to provide the percentages indicated, it has been observed that increased amounts of the reactants consumed in the reaction appear as glycol acetates and glycol precursors, whereby desirable yield values are realized. The expression "formic moieties" is intended to include formic acid itself, as well as derivatives of formic acid which are formed in the oxidation reaction with which this invention is concerned, especially formates and more particularly, glycol mono-formates and di-formates. The formic moieties which are used to provide the above-indicated percentages may be any one or any combination of such compounds containing the formyl radical.

The reaction system of this invention is more particularly directed to the production of mono- and di-acetates of ethylene glycol by the oxidation with molecular oxygen of ethylene in the presence of acetic acid and in the presence of a catalyst system comprising a non-noble metal variable valent cation plus at least one of bromine, chlorine, a bromine-containing compound or a chlorine-containing compound. Such catalyst systems are disclosed, for example in U.S. Pat. No. 3,668,239, U.S. Pat. No. 3,689,535, British Pat. No. 1,289,535, and U.S. application Ser. No. 187,552, filed Oct. 7, 1971, and said patents and application are incorporated herein by reference. The following equations illustrate the primary chemical reactions involved in the process of this invention:

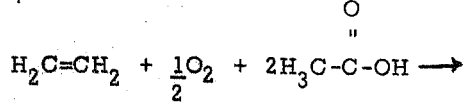

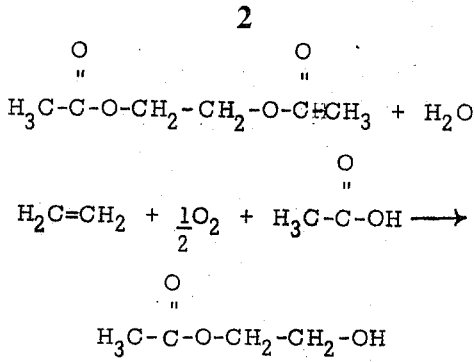

The illustrated reactions occur in the liquid phase, within an oxidation zone containing a liquid phase reaction medium. While ethylene and acetic acid are also used as reactants in the production of vinyl acetate and of acetaldehyde, using noble-metal catalysts as described, for example, in British Pat. No. 1,216,700 wherein reference is made to formic acid, the reactions of the foregoing equations are basically different from the reaction with which the British patent is concerned and are conducted in a different catalyst environment to yield different products and they involve a reaction medium of distinctive composition.

The liquid-phase reaction medium with which this invention is concerned contains the acetic acid, formic acid, the ester products of the reaction, glycol precursors, reaction by-products, including water, as well as the non-noble metal catalyst system employed, dissolved ethylene and dissolved oxygen also being present. Normally, the liquid reaction medium will contain from 30 to 90 weight percent of acetic acid, 5 to 60 weight percent of reaction products including glycol di-acetate, glycol mono-acetate, glycol precursors, and by-products. The term glycol precursors is used to define reaction products which, like the glycol acetates, are convertible to glycol by hydrolysis, or are convertible into glycol esters e.g. by recycling to the reaction zone, or by reaction with a carboxylic acid, i.e. they are compounds which embody a glycol moiety. Such precursors include ethylene glycol itself, other esters, as well as halogenated compounds, the halogen being introduced into the system as a catalyst component. The halogenated precursors, assuming the halogen to be bromine, include ethylene bromohydrin, 2-bromoethyl acetate, 1,2-dibromoethane and other brominated derivatives. In addition to water, the principal by-products are $CO_2$ and $CO$, with minor amounts of other organic compounds such as formaldehyde, acetaldehyde, glycolic acid, dioxane, methyl acetate and high-boiling materials, as well as some formic acid, also being formed. In accordance with the invention, it is possible to increase the quantity of glycol esters and glycol precursors in relation to carbon-containing by-products. In other words, the selectivity to esters and precursors is increased.

The catalyst system will generally be present in the amount of 0.1 to 30 percent by weight. The reaction is preferably carried out continuously with a portion of the liquid phase reacion reaction being continuously withdrawn from the oxidation zone and processed to recover reaction products, unconverted reactants, and by-products, some of which are recycled to the oxidation zone, as will be hereinafter discussed. At the same time, ethylene, acetic acid, and oxygen, together with recycle components are continuously introduced into the reaction zone. Thus, the liquid feed is composed primarily of acetic acid, e.g. 65 to 95 weight percent, but also comprises the catalyst components dissolved or suspended in it in amounts to provide the above-indicated concentrations in the reaction zone, and recycle materials such as glycol esters, e.g. 1 to 15 weight percent and higher boiling materials e.g. 1 to 20 weight percent. The content of formic moieties is selected to provide the desired 3 to 10, preferably 4 to 8, weight percent.

The molecular-oxygen-containing gas can be supplied in concentrated form, i.e. having an oxygen content of 85 mol % or more or it can be supplied in the form of air or as enriched air or diluted air. The oxygen-containing gas and ethylene need not be specifically purified and can contain those impurities normally associated with them. For example, the ethylene can contain normal quantities, e.g. up to 10 mol % of ethane and the oxygen can contain nitrogen, argon, etc.

The acetic acid can be employed in any commercially-available form, including aqueous solutions, but it is preferred to employ commercial acetic acids having no more than 25 percent water and especially less than 15 percent water, such as 90–98 percent acetic acid or glacial acetic acid. The acetic acid used can also contain the various organic or inorganic impurities normally associated with the various commercially-available forms of this acid.

The catalyst systems, such as disclosed in the above-mentioned U.S. Pat. Nos. 3,668,239 and 3,689,535 and British Pat. No. 1,289,535, combine a variable valent cation with at least one of bromine, chlorine, a bromine-containing compound, or a chlorine-containing compound. The variable valent cation is tellurium, cerium, antimony, manganese, vanadium, gallium, arsenic, cobalt, copper, chromium, or selenium cation or mixtures thereof. These cations can be supplied to the system in their elemental form and added to the oxidation zone as a fine powder or can be added in any form which, in solution or suspension under oxidation conditions, will yield at least some soluble ions. For example, the cation source can be the carbonate, oxide, hydroxide, bromide, chloride, lower ($C_1$–$C_3$) alkoxide (e.g. the methoxide), phenoxide or carboxylates, especially the acetates. In a preferred aspect, the cation-containing compound employed can contain impurities normally associated with the commercially available compounds, and need not be purified any further.

The preferred systems, when using bromine or a bromine-containing compound, employ tellurium, cerium, antimony, manganese or vanadium, with tellurium, cerium, antimony, and manganese being most preferred. For use with chlorine or a chlorine-containing compound, the preferred catalyst systems use cerium, manganese, arsenic, cobalt, copper, selenium, or chromium; the more preferred being cerium, manganese, cobalt, copper and selenium, with the most preferred being cerium, manganese and cobalt.

When it is desired to use a bromine or chlorine-containing compound in the reaction instead of bromine or chlorine itself, one can employ any compound capable upon oxidation or by other means, of producing bromide or chloride ions in solution. For example, one can use hydrohalic acids (gaseous or aqueous, preferably concentrated aqueous acid) any metal halide such as the alkali, alkaline earth or heavy metal bromides or chlorides (potassium bromide, calcium chloride, manganese bromide and the like), the metal bromides or chlorides corresponding to the variable valence cations or organo-chlorine and organo-bromine compounds such as tri-halides, lower aliphatic ($C_1$–$C_6$) halides (propylhalide, pentylhalide), cyclo lower aliphatic halides (cyclohexylhalide), or lower aliphatic dihalides (ethylene di-chloride, di-bromo-ethylene), all of which are considered to be compounds capable of producing bromide or chloride anions. Also contemplated is the use of a mixture of two or more halogen-producing compounds, containing the same or different halogen, as well as mixtures wherein the cation of the halide compound can be the same or different from the cation of the other metal compound employed. The halogen employed can suitably contain impurities normally associated with the commercially available halogen, and in the preferred aspect of this invention the commercially available materials are employed.

Of all the catalyst systems, the most preferably employed is one comprising a tellurium cation (supplied to the oxidation zone in the powdered elemental form, the oxide, the carbonate or in any one or more of the forms referred to above) in conjunction with a bromine source.

The various reactants employed in the oxidation reaction may be effectively used over a wide range of concentrations. The effective minimum concentrations of catalysts will depend upon temperature, residence time and the type of halogen, expressed in weight percent of halogen to total liquid phase within the oxidation zone, and can be from 0.01 to 30 percent or higher, desirably from 0.1 to about 20 percent and especially from about 0.5 to about 10 percent. The concentration of total metal cation present expressed in terms of equivalents of cation per equivalent of halogen can suitably vary from about 1:0.01 to about 1:100, but desirably from about 1:0.2 to about 1:40 preferably from aout 1:1 to about 1:20. The temperatures maintained in the oxidation zone may vary from about 50°C. to the bubble point of the liquid phase reaction mixture within the zone, with temperatures from about 90°C. to about 200°C. being preferred. Total pressures within the oxidation zone can be sub-atmospheric, atmospheric, or super-atmospheric, with pressure up to about 5,000 psia or higher being operable. Pressures from about 15 psia to about 1,000 psia are normally desired, while pressures from about 20 psia to about 1,000 psia, and especially from about 50 psia to about 700 psia, are particularly preferred.

While the mol ratio of oxygen to olefin fed to the system can be varied to assist in maintaining olefin liquid phase concentration, the mol ratio of oxygen to olefin is not critical and, therefore, any suitable ratios can be used. For example, such ratios as 1:1000 to 1:001 may be used. Of course, care should be taken to avoid formation of flammable mixtures.

Reaction time, i.e. residence time within the reactor, can vary widely. Flow rates are preferably adjusted so that the rate of formation of product, measured as rate of formation of glycol ester, is from about 0.1 to about 10.0 gm-mols per liter of liquid phase reaction medium per hour.

As hereinbefore indicated, the process of this invention preferably involves continuous operation with the ethylene and molecular oxygen reactant being continuously introduced to the oxidation zone and being continuously reacted therewithin. The acetic acid reactant normally would also be fed continuously to the oxidation zone, and the liquid phase reaction medium would normally be continuously withdrawn therefrom, the liquid phase reaction medium containing the desired ester products and their precursors. However, it should be noted that the acetic acid reactant can be introduced intermittently and the liquid phase reaction medium, containing the reaction products, can be withdrawn intermittently without thereby rendering the process other than a continuous one. The reaction can conveniently be carried out in the reaction vessel although, if desired, the reaction can be carried out in two or more vessels connected in series.

In typical operation of the process of this invention, there is withdrawn a gaseous effluent composed primarily of inert gases introduced with the oxygen, unreacted oxygen, unreacted ethylene, CO, $CO_2$ and minor amounts of vaporized normally liquid components of the liquid reaction mixture. This gaseous effluent is suitably partially condensed in order to liquefy the condensible components, which may be combined with the liquid feed stream to the oxidation zone and the non-condensed component of the gaseous effluent is recycled to the oxidation zone where it is supplemented by makeup ethylene and oxygen-containing gas, or the effluent gases are recycled without condensation; condensation being employed only on the purge gas. Suitably, a purge is removed from the cycle gaseous stream to prevent the build up of inert components. At the same time, there is withdrawn a liquid effluent which represents a portion of the liquid reaction medium and, in a continuous operation wherein there is a continuous or substantially continuous introduction of a liquid feed, the liquid effluent may be overflow stream taken at the desired liquid level in the reaction zone. This liquid effluent is then processed to recover product glycol acetates, to remove water and undesired organic by-products, and to provide recycle streams to be returned to the oxidation zone along with makeup acetic acid and makeup catalyst components, and some of these recycle streams are utilized in providing the specified 3 to 10 weight percent of formic moieties in the liquid stream eventually introduced into the oxidation zone, as will be pointed out as the description proceeds. Thus, in a typical system which is, however, given by way of illustration only and which is susceptible of considerable variation, as will readily be apparent to those skilled in the art, the product stream from the oxidation zone is subjected to vaporization, preferably in a fractional distillation zone, although flash vaporization may suitably be employed, to recover overhead the more volatile components of the mixture, including water, carboxylic acids, and some halogen-containing compounds thus largely separated form the heavier components which include glycol esters, some carboxylic acid, heavier halogen-containing compounds, non-volatile catalyst components, and the like. Advantageously, although not necessarily, the lighter fraction is then treated for water removal. Thus, the lighter fraction can be passed to a second distillation zone wherein it is mixed with an azeotroping agent which forms an azeotrope with water and the mixture is subjected to azeotropic distillation to effect a separation of water overhead away from substantially all of the other components of the low boiling fraction, including carboxylic acids, halogen compounds and lower boiling esters which may be present. Azeotroping agents useful for removal of water are, broadly, those compounds forming azeotropes with water which have atmospheric boiling points less than about 90°C. and especially those compounds which are partially or completely insoluble in water. Such compounds include: hydrocarbons, paraffinic or olefinic, having from 5 to 8 carbon atoms, such as, pentane, hexane, heptane, octane, pentene, hexene, cyclohexene, cyclohexane, cyclopentane, methyl cyclohexane, cyclohexadiene and diisobutylene; aromatics, such as benzene, xylene, toluene, ethylbenzene, cumene and styrene; nitriles having 2 to 4 carbon atoms, such as acrylonitrile and methyacrylonitrile; alcohols having 3 to 4 carbon atoms, and cyclohexanol; esters of acetic, acrylic, propionic, butyric, and formic acid with methyl, ethyl, propyl, butyl and allyl alcohols; ethers having 5 to 8 carbon atoms; ketones having 4 to 7 carbon atoms such as cyclohexanone; and nitromethane; methyl nitrate and trimethylamine, and the like.

The amount of azeotroping agent added is at least that required to form the known atmospheric azeotrope with the quantity of $H_2O$ to be removed. The optimum amounts for a particular system can be readily determined by those skilled in the art. As more azeotroping agent is used, the number of trays in the distillation column is reduced, but the heat requirements for each pound of water removed increases. From the economic standpoint it is generally uneconomical to use more than five times the minimum required to form the atmospheric azeotrope. In practice, this means that from about one-tenth to about 10 times the volume of the azeotroping agent should be employed for each volume of water to be removed.

When the first distillation of the liquid effluent is a flash distillation so that the overhead fraction contains substantial amounts of esters and heavier-boiling materials, the overhead fraction may be fractionally distilled to effect a further separation of its components before removal of water and recovery of product glycol esters.

Alternatively, the liquid reactor effluent is not initially distilled to separate water and low-boiling halogen compounds from the bulk of the ester reaction products and other higher-boiling materials before azeotropic dehydration, but rather the liquid effluent is directly subjected to azeotropic distillation whereby the water substantially free from admixture with other components of the reaction effluent is separated as an overhead product and the bottoms from this azeotropic dehydration are then distilled to separate a lighter fraction comprising carboxylic acids and components which are lower-boiling than the product esters.

The heavier fractions from the foregoing distillations, which contain the product esters along with higher-boiling materials and non-volatile materials, are then suitably subjected to further distillation to effect a separation of the product esters from the remainder of the heavier fraction, the product esters being taken as an overhead fraction and the heavier portion being withdrawn as a bottoms product for ultimate recycling.

In carrying out the foregoing distllations, any conventional apparatus may be used, such as continuous tray or packed columns, and the pressures and temperatures can be varied appropriately in conventional manner to achieve the desired separations.

Typically, however, the preferred manner of operation the liquid-product-containing effluent from the oxidation zone is first fractionally distilled to separate lower-boiling components from the product glycol acetates and associated heavier components prior to azeotropic distillation. The fractionation is carried out at pressure of 3 psia to 50 psig will still temperatures of 120° to 260°C. The axeotropic distillation is carried out at pressures of 7 psia to 50 psig and still temperatures of 70° to 180°C., and distillation to separate the product glycol acetates from the heavier, i.e. higher-boiling, components is carried out at pressures of 3 psia to 50 psig and still temperatures of 120° to 260°C. The result of these distillations is to provide a glycol acetate product fraction or mixture which is removed from the system in a form wherein the glycol acetates are the predominant components in association with essentially no acetic and water and essentially no high-boiling materials. In the course of providing this product mixture is effectively separated into an aqueous fraction with very minor amounts, e.b. up to about 2 percent, of miscellaneous low-boiling by-products of the reaction, which is discarded, or recycled and a series of intermediate or higher-boiling fractions which can be recycled, after suitable addition of makeup components, to the oxidation zone. It is this combined recycle stream with its makeup components that is selected to contain 3 to 10 weight percent of formic moieties introduced into the oxidation zone to carry out the process in accordance with the invention. As previously mentioned these formic moieties may be in the form of formic acid itself or they may be in the form of glycol formates which may be mono- or diesters or halogenated derivatives or mixed formate-acetate ester. Together they provide a liquid feed to the reaction zone which makes possible increased conversion and yields in comparison with a feed free from such formic moieties or containing significantly lesser or greater amounts of these moieties. By carrying out the processing of the liquid effluent from the oxidation zone in the general manner described, it is ordinarily possible to provide a liquid feed stream to the oxidation zone which has a content of formic moieties falling substantially within the above-indicated range but it is within the scope of this invention to introduce additional amounts of formic moieties in order to provide the desired content of the liquid feed stream.

The accompanying drawing is a schematic representation of an illustrative system which may be employed in carrying out the process of this invention. The following description of the drawing will serve to provide a fuller understanding and explanation of the invention and its advantages. In the following discussion the reactants are ethylene, acetic acid and oxygen, while the catalyst system is assumed to be cationic tellurium and anionic bromine, the latter being conveniently supplied as hydrogen bromide. Continuous operation is assumed, although this invention is not so limited.

To oxidation zone 10, within which is maintained a liquid phase reaction medium 11, are fed ethylene via conduit 12, oxygen via conduit 13 and the recycled vapor stream via conduit 14. While only the recycled vapor and oxygen-containing gas are shown as introduced through a sparger 16, all gaseous materials would normally be introduced in similar fashion. Mechanical agitating equipment (not shown) can be provided if desired.

Also introduced to oxidation zone 10 is recycle liquid stream to be described below, which is fed through line 18. Combined with the recycle liquid stream are make-up acetic acid (via conduit 19) and make-up catalyst (e.g. tellurium oxide and HBr) through line 20. As shown, the make-up catalyst is suitably suspended or dissolved in the recycle liquid stream and the make-up acetic acid is also added to this stream before it enters the oxidation zone. Although the other feeds are preferably continuously fed to the oxidation zone, make-up acetic acid and/or make-up catalyst can readily be introduced intermittently, if desired.

The drawing indicates separate introduction of ethylene and oxygen with the recycled vapor being combined with the oxygen. Alternatively, ethylene feed could be pre-mixed with the recycled vapor prior to entering oxidation zone 10, and the oxygen could be separately introduced. If desired, the recycled vapor could also be introduced separately. Normally, however, two or more of these components would be pre-mixed prior to entering the oxidation zone. These alternatives permit one to operate in a manner such that the total oxidation zone gaseous feeds could be so rich in oxygen as to be within the flammable region were they fully premixed, since it is not possible to propogate a combustion once the gases are mixed with the liquid phase.

Vapor comprising unreacted ethylene and oxygen together with gaseous by-products and diluents and more volatile components of the liquid phase reaction medium is withdrawn from oxidation zone 10 via conduit 22 and partially condensed in cooler 24. Condensed liquid and uncondensed vapor are separated from each other in separator 26. As shown, the condensed liquid is withdrawn from separator 26 through line 28, and a small quantity of this vapor may be purged via line 25 in conventional manner. The balance of the vapor is the recycled vapor stream returned to oxidation zone 10 via conduit 14.

A portion of the liquid-phase reaction medium is withdrawn from the oxidation zone 10 by means of line 19 and is fed to distillation zone 30. Within distillation zone 30 a volatile fraction comprising water, acetic acid, and components more volatile than the product esters are separated from a residual fraction comprising the product esters and less volatile and non-volatile components, and the volatile fraction is, in turn, separated into low-boiling constituents and an acetic acid-water fraction which may also contain close-boiling components such as halogenated, e.g. brominated, compounds.

As seen in the drawing, the low-boiling constituents which are more volatile than the acetic acid-water fraction are withdrawn through line 32, the acetic acid-water fraction is passed into azeotropic distillation zone 35 through line 36 and the residual fraction comprising the product esters is withdrawn through line 38 and passed to product distillation zone 40. The light components removed as vapor from the top of distillation zone 30 through line 32 may be discarded or they may be treated to recover individual components or they may be condensed and combined with the recycle liquid stream flowing through line 18 back to oxidation zone. These several options are not illustrated but their application will be readily apparent to those skilled in the art. The aqueous acetic acid fraction is subjected in zone 35 to azeotropic distillation in the presence of an azeotroping agent of the character indicated above which forms a minimum boiling azeotrope with water and the vapor overhead from azeotropic distillation zone 35, which consists almost exclusively of water and azeotroping agent, passes through line 42 into condenser 44 and the condensate is then separated in separator 46 into an aqueous phase which is discarded through line 48 and an organic phase composed primarily of the azeotroping agent which is returned as reflux through line 50 to azetropic distillation zone 35. Make-up azeotropic agent is suitably added as required through line 52, communicating with separator 46. The non-vaporized fraction of the feed to azeotroping zone 35 is withdrawn through line 54 and mixed with recycle stream in line 18. In product separation zone 40, the rsidual glycol acetate-product-containing fraction composed primarily of product glycol acetates which, after removal by distillation of any halogenated compounds which may be present, can be used as such, e.g. as solvents or plasticizers or can be subjected to further treatment, for example, hydrolysis with water to yield ethylene glycol, or pyrolysis to yield vinyl acetate, as described, for example, in Kollar U.S. Pat. No. 3,689,535. A heavier fraction composed of higher-boiling constituents and non-volatile components, including components of the catalyst system, are withdrawn from distillation zone 40 through line 58. A portion of this stream may be withdrawn as a purge through line 60 and the remainder forms a recycle stream which enters line 18 for return to oxidation zone 10. This liquid recycle stream which, following the addition of the heavier-boiling fraction from azeotropic distillation zone 35 from line 54, the stream of halogenated compounds removed from the product acetates, and optionally, addition of the condensed volatile fraction from line 32, together with makeup catalyst supplied through line 20 and the makeup acetic acid entering through line 19 is the vehicle for the specified 3 to 10 weight percent formic moieties which are supplied to the oxidation zone 10 in accordance with the invention.

The following examples will serve to illustrate this invention further but are not intended to limit the scope thereof. Unless otherwise indicated, all parts and percents are on a weight basis. The term selectivity means mols of glycol esters and precursors which are formed per mol of ethylene reacting, expressed as a percentage.

EXAMPLES

Ethylene is oxidized in the presence of acetic acid in a series of oxidations. In each oxidation, apparatus comprising a 7.5 liter jacketed autoclave, with a draw-off arranged to maintain a 3.9 liter liquid volume within the autoclave, is employed. The autoclave is initially filled to the designated liquid level with a slurry of tellurium dioxide and hydrogen bromide suspended and/or dissolved in glacial acetic acid. The autoclave is then heated under nitrogen to 145°C. and ethylene and oxygen feeds are commended at rates so as to maintain an 8 percent concentration of each in the effluent gases from the oxidation zone. Gas withdrawn from the autoclave is recycled at a rate of 7,000–8,000 std. l/hr. for admixture with the fresh gaseous reactants supplied, while a portion is purged to control buildup of by-product gases ($CO + CO_2$). Pressure is maintained at 400 psig by regulating this rate of gas withdrawal. The recycling gas is cooled to 20°C. to recover the acetic acid contained therein. Liquid-phase reaction medium is withdrawn as it exceeds the designated level and is first flash distilled at a temperature of about 120°–130°C. (60–85 mm Hg) to obtain an overhead fraction composed primarily of water, acetic acid, gylcol esters, and small amounts of higher-boiling materials, and a residue fraction comprising the remaining higher-boiling materials, including non-volatile catalyst values, plus some gylcol esters. The overhead fraction is fractionally distilled in an Oldershaw column containing 10 trays below the feed tray and 25 trays above the feed tray. The column is operated at atmospheric pressure with a bottoms temperature of about 210°–230°C. to separate most of the glycol esters and the lower boiling materials as overhead suitable for eventual recovery, and to provide a bottoms fraction of the higher-boiling materials plus some of the glycol esters. The two bottoms fractions, which together comprise the higher-boiling materials, including non-volatile catalyst components, and minor amounts of glycol esters, are combined with makeup acetic acid and bromine values (as HBr), and in some cases formic acid, to provide a liquid feed stream which is supplied at a rate sufficient to maintain a constant draw-off stream of liquid-phase reaction medium, the withdrawal rate corresponding roughly to a three-quarter hour residence time. For the purposes of these experiments, acetic acid, formic acid and halogenated organic compounds having boiling points lower than those of the glycol esters removed in the overhead fractions are not recycled, but equivalent results are obtained when such recycling is effected to provide part of the acetic acid, bromine and, in accordance with the invention, formic acid components of the liquid feed.

After about 48 hours of continuous operation in the manner described above, during which samples are periodically taken and analyzed to ascertain composition, steady-state operation is achieved. These experiments show the effect on selectivity and by-product formation of supplying controlled quantities of formic acid in the liquid feed to the oxidation zone, the amount of formic acid ranging from 0 to 10 percent.

The following table lists relevant stream composition for these oxidation runs, together with selectivities determined after steady-state is obtained.

| | Oxidizer Liquid Feed | | | Conversion to By-Products Mols Per 100 mols Ethylene | | |
|---|---|---|---|---|---|---|
| Run No. | % Te | % Br | % Formic Acid | $Co + CO_2$ | Total By-Products | Selectivity |
| 1 | 0.75 | 8.2 | 0 | 2.7 | 13.4 | 86.6 |
| 2 | 1.9 | 8.5 | 0 | 3.3 | 12.3 | 87.7 |
| 3 | 1.2 | 7.0 | 2.38 | 2.7 | 15.8 | 84.2 |
| 4 | 0.95 | 6.5 | 5 | 3.8 | 8.1 | 91.9 |
| 5 | 1.3 | 7.5 | 5 | 3.5 | 4.6 | 95.4 |
| 6 | 1.9 | 8.4 | 5 | 2.4 | 5.1 | 94.9 |
| 7 | 1.5 | 8.5 | 10 | 4.3 | 1.6* | 98.4 |
| 8 | 1.8 | 8.0 | 10 | 4.6 | 0** | 100 |

*Actual total by-products amount to 6.7 mols, by adjustment is made for 5.1 mols formic acid consumed.
**Actual by-product total is approximately 7.4 mols but adjustment is made for a corresponding 7.4 mols formic acid consumed.

The data in the foregoing table show that the use in the liquid feed of controlled quantities of formic acid within the range of the invention, and especially within the preferred range, leads to a significant increase in selectivity to desired products, with a corresponding decrease in by-product formation. Although the selectivity of the reaction without the controlled quantities of formic acid is high, as seen in Runs 1 and 2, in accordance with the invention it is possible to increase the selectivity by a significant amount to even higher values. As evidenced by Run 3, small amounts of formic acid outside the range of the invention do not improve selectivity, but Runs 4–8 demonstrate that formic acid quantities within the range do have a surprising selectivity-increasing effect. Although selectivity values are particularly high at the top of the specified formic acid range, analytical data show that significant amounts of formic acid begin to be consumed at this point, which creates an upper limit on formic acid usage from a practical, economic standpoint.

I claim:

1. In a process for producing glycol acetates by reacting acetic acid, ethylene and molecular oxygen in an oxidation zone in the presence of a catalyst system comprising a variable valent cation selected from at least one member of the group consisting of tellurium, cerium, antimony, manganese, vanadium, gallium, arsenic, cobalt, copper, chromium, and selenium and at least one of bromine, chlorine, a bromine-containing compound yielding bromide ions during reaction, or a chlorine-containing compound yielding chloride ions during reaction to produce a reaction mixture containing said product glycol acetates, said oxidation zone being supplied with a liquid feed comprising acetic acid, the improvement which comprises maintaining in said liquid feed a level of formic moieties of 3 to 10 weight percent.

2. A process as defined in claim 1, wherein said formic moieties are maintained in the range of 4 to 8 weight percent in said liquid feed to said oxidation zone.

3. In a process for producing glycol acetates by reacting acetic acid, ethylene and molecular oxygen in an oxidation zone in the presence of a catalyst system comprising a variable valent cation selected from at least one member of the group consisting of tellurium, cerium, antimony, manganese, vanadium gallium, arsenic, cobalt, copper, chromium, and selenium and at least one of bromine, chlorine, a bromine-containing compound yielding bromide ions during reaction, or a chlorine-containg compound yielding chlorine ions during reaction to produce a reaction mixture comprising said product glycol acetates in combination with water, unreacted acetic acid, and higher boiling components of the reaction, the liquid feed to said oxidation zone comprising said acetic acid, components of said catalyst system and recycled higher boiling components, the improvement which comprises maintaining in said liquid feed a level of formic moieties of 3 to 10 weight percent.

4. A process as defined in claim 3, wherein said formic moieties are maintained in the range of 4 to 8 weight percent in said liquid feed to said oxidation zone.

5. In a process for producing glycol acetates by reacting acetic acid, ethylene and molecular oxygen in an oxidation zone in the presence of a catalyst system comprising a variable valent cation selected from at least one member of the group consisting of tellurium, cerium, antimony, manganese, vanadium, gallium, arsenic, cobalt, copper, chromium, and selenium and at least one of bromine, chlorine, a bromine-containing compound yielding bromide ions during reaction, or a chlorine-containing compound yielding chloride ions during reaction to produce a liquid effluent comprising said product glycol acetates in combination with more volatile components and higher boiling components, including essentially non-volatile components, the improvement which comprises subjecting said liquid effluent to distillation to separate at least some of said product glycol acetates and more volatile components from said high boiling components, preparing a liquid feed to said oxidation zone comprising acetic acid, at least some of said higher-boiling components and makeup catalyst components, together with 3 to 10 weight percent of formic moieties, and introducing said liquid feed into said oxidation zone for reaction with ethylene and molecular oxygen.

6. A process as defined in claim 5, wherein said formic moieties are maintained in the range of 4 to 8 weight percent in said liquid feed to said oxidation zone.

7. In a process for producing glycol acetates by reacting acetic acid, ethylene and molecular oxygen in an oxidation zone in the presence of a catalyst system comprising a variable valent cation selected from at least one member of the group consisting of tellurium, cerium, antimony, manganese, vanadium, gallium, arsenic, cobalt, copper, chromium, and selenium and at least one of bromine, chlorine, a bromine-containing compound yielding bromide ions during reaction, or a chlorine-containing compound yielding chloride ions during reaction to produce a liquid effluent containing said glycol acetates in combination with water, unreacted acetic acid, liquid by-products of the reaction and non-volatile components, the improvement which comprises subjecting said liquid effluent to a plurality of distillation steps to separate therefrom a product stream composed primarily of said product glycol acetates, an aqueous stream, an acetic acid stream composed primarily of acetic acid and lower-boiling non-aqueous components of the liquid effluent, and a stream of components having higher-boiling points than said product glycol acetates and including non-volatile components, preparing a liquid feed to said oxidation zone from said acetic acid stream, said stream of higher-boiling components, makeup acetic acid, and makeup catalyst, said liquid feed being provided with 3 to 10 weight percent of formic moieties, and introducing said liquid feed into said oxidation zone for reaction with ethylene and molecular oxygen.

8. A process as defined in claim 7, wherein said formic moieties are maintained in the range of 4 to 8 weight percent in said liquid feed to said oxidation zone.

9. A process for producing glycol acetates which comprises reacting acetic acid, ethylene and molecular oxygen in an oxidation zone in the presence of a catalyst system comprising a variable valent cation selected from at least one member of the group consisting of tellurium, cerium, antimony, manganese, vanadium, gallium, arsenic, cobalt, copper, chromium, and selenium and at least one of bromine, chlorine, a bromine-containing compound yielding bromide ions during reaction, or a chlorine-containing compound yielding chloride ions during reaction to produce a reaction mixture containing said product glycol acetates, continuously removing said reaction mixture from said oxidation zone, and continuously introducing said liquid feed into said oxidation zone, said liquid feed having maintained in it a level of formic moieties of 3 to 10 weight percent.

10. A process as defined in claim 9 wherein said formic moieties are maintained in the range of 4 to 8 weight percent in said liquid feed to said oxidation zone.

11. A process for producing glycol acetates by reacting acetic acid, ethylene and molecular oxygen in an oxidation zone in the presence of a catalyst system comprising a variable valent cation selected from at least one member of the group consisting of tellurium, cerium, antimony, manganese, vanadium, gallium, arsenic, cobalt, copper, chromium, and selenium and at least one of bromine, chlorine, a bromine-containing compound yielding bromide ions during reaction, or a chlorine-containing compound yielding chloride ions during reaction to produce a liquid effluent comprising said product glycol acetates in combination with more volatile components and higher boiling components, including essentially non-volatile components, subjecting said liquid effluent to distillation to separate at least some of said product glycol acetates and more volatile components from said higher boiling components, preparing a liquid feed to said oxidation zone comprising acetic acid, at least some of said higher-boiling components and makeup catalyst components, together with 3 to 10 weight percent of formic moieties, and introducing said liquid feed into said oxidation zone for reaction with ethylene and molecular oxygen.

12. A process as defined in claim 11, wherein said formic moieties are maintained in the range of 4 to 8 weight percent in said liquid feed to said oxidation zone.

13. A process for producing glycol acetates by reacting acetic acid, ethylene and molecular oxygen in an oxidation zone in the presence of a catalyst system comprising a variable valent cation selected from at least one member of the group consisting of tellurium, cerium, antimony, manganese, vanadium, gallium, arsenic, cobalt, copper, chromium, and selenium and at least one of bromine, chlorine, a bromine-containing compound yielding bromide ions during reaction, or a chlorine-containing compound yielding chloride ions during reaction to produce a liquid effluent containing said glycol acetates in combination with water, unreacted acetic acid, liquid by-products of the reaction and non-volatile components, subjecting said effluent to a plurality of distillation steps to separate therefrom a product stream composed primarily of said product glycol acetates, an aqueous stream, an acetic acid stream composed primarily of acetic acid and lower-boiling non-aqueous components of the liquid effluent, and a stream of components having higher boiling points than said product glycol acetates and including non-volatile components, preparing a liquid feed to said oxidation zone from said acetic acid stream, said stream of higher-boiling components, makeup acetic acid, and makeup catalyst, said liquid feed being provided with 3 to 10 weight percent of formic moieties, and introducing said liquid feed into said oxidation zone for reaction with ethylene and molecular oxygen.

14. A process as defined in claim 13, wherein said formic moieties are maintained in the range of 4 to 8 weight percent in said liquid feed to said oxidation zone.

* * * * *